United States Patent [19]

Schmid et al.

[11] Patent Number: 5,411,586
[45] Date of Patent: May 2, 1995

[54] LUSTER PIGMENTS CONTAINING BISMUTH VANADATE

[75] Inventors: Raimund Schmid, Neustadt; Norbert Mronga, Dossenheim; Harald Ochmann, Dannstadt-Schauernheim; Christoph Schwidetzky, Hassloch, all of Germany

[73] Assignee: BASF Aktiengesellschaft, Ludwigshafen, Germany

[21] Appl. No.: 266,481

[22] Filed: Jun. 27, 1994

[30] Foreign Application Priority Data

Jul. 2, 1993 [DE] Germany .................. 43 22 020.7

[51] Int. Cl.6 .............................. C04B 14/00
[52] U.S. Cl. .................... 106/415; 106/479
[58] Field of Search .................. 106/415, 479

[56] References Cited

U.S. PATENT DOCUMENTS

| | | |
|---|---|---|
| 3,087,828 | 4/1963 | Linton . |
| 3,087,829 | 4/1963 | Linton . |
| 4,063,956 | 12/1977 | Higgins . |
| 4,328,042 | 4/1982 | Ostertag et al. . |
| 4,344,987 | 8/1982 | Ostertag . |
| 4,552,593 | 11/1985 | Ostertag . |
| 4,867,793 | 9/1989 | Franz et al. . |
| 4,978,394 | 12/1990 | Ostertag et al. . |
| 5,277,711 | 1/1994 | Schmidt et al. . |
| 5,336,312 | 8/1994 | Byrne et al. ............ 106/479 |

FOREIGN PATENT DOCUMENTS

| | | |
|---|---|---|
| 33457 | 1/1981 | European Pat. Off. . |
| 45851 | 7/1981 | European Pat. Off. . |
| 1467468 | 12/1968 | Germany . |
| 3237264 | 4/1984 | Germany . |
| 3617430 | 11/1987 | Germany . |
| 4104310 | 8/1992 | Germany . |
| 4141069A1 | 6/1993 | Germany . |

*Primary Examiner*—Mark L. Bell
*Assistant Examiner*—Scott L. Hertzog
*Attorney, Agent, or Firm*—Oblon, Spivak, McClelland, Maier, & Neustadt

[57] ABSTRACT

Luster pigments comprise coated plateletlike substrates wherein the coating comprises a layer comprising bismuth vanadate.

9 Claims, No Drawings

LUSTER PIGMENTS CONTAINING BISMUTH VANADATE

The present invention relates to novel luster pigments comprising coated plateletlike substrates wherein the coating comprises a layer comprising bismuth vanadate.

The invention further relates to the preparation of these luster pigments and to the use thereof for coloring paints, printing inks, plastics, glasses, ceramic products and decorative cosmetic preparations.

Luster or effect pigments are increasingly used in many sectors of industry, for example in automotive coatings, decorative coatings, plastics pigmentation, paints printing inks, in particular security inks, and cosmetics.

Their optical effect is based on directional reflection at predominantly sheetlike, oriented metallic or strongly refractive pigment particles. According to the nature of the pigment particles, the pigments are known as metallic effect pigments (eg. aluminum, zinc or copper flakes) or pearl luster pigments (eg. highly refractive, transparent, plateletlike metal oxides such as bismuth oxychloride or silicatic substrates such as muscovite, phlogopite, biotite, talc or glass coated with highly refractive metal oxides such as titanium dioxide or zirconium dioxide).

On top of that there are a number of combination pigments where the abovementioned pigments are coated with further, in particular colored, highly refractive metal oxides such as chromium oxide and in particular iron oxide. Interference, reflection and absorption phenomena create a multiplicity of angle-dependent color and lightness effects depending on the thickness of the metal oxide layer. These pigments can therefore also be termed interference-absorption pigments or—in the case of a metallic substrate—interference-reflection pigments.

The known luster pigments provide good coverage of red to gold hues in particular, but there are no pure yellow luster pigments of high color strength.

The yellow luster pigments which are commercially available are all more or less reddish, which in general is due to the incorporation of Fe(III) compounds. True, mica coated with titanium dioxide, for example, can have very clean interference colors in the yellow region, but the hues are pastel-like and lack color strength. True, enhancement of the mass tone is possible through the incorporation of non-selectively absorbing layers, as described for example in DE-A 41 41 069, but in the application medium of a paint the flop of the pigments is accompanied by a loss of color strength tending toward the achromatic.

It is an object of the present invention to provide strong yellow luster pigments which are free of the aforementioned disadvantages and are advantageously useful for the purposes mentioned.

We have found that this object is achieved by luster pigments comprising coated plateletlike substrates where the coating comprises a layer comprising bismuth vanadate.

We have further found a process for preparing these luster pigments, which comprises using an alkaline vanadate solution to precipitate bismuth vanadate from an acidic bismuth salt solution in the presence of the substrate particles to be coated and of a base and in the presence or absence of dissolved phosphates, borates and/or hydrolyzable metal salts, filtering off the coated substrate particles thus obtained and washing and drying them.

We have additionally found that these luster pigments are useful for coloring paints, printing inks, plastics, glasses, ceramic products and decorative cosmetic preparations.

Suitable starting materials for the luster pigments of the invention are basically all plateletlike substrates which are stable under the conditions of the process of the invention.

Of particular suitability are silicatic substrates such as light-colored or white mica with flakes of preferably wet ground muscovite being particularly preferred. It is of course also possible to use other natural micas such as phlogopite and biotite, artificial micas, and talc and glass flakes.

The silicatic substrate particles are preferably coated in a first layer with highly refractive metal oxides such as titanium, zirconium, tin, aluminum, silicon or zinc oxide, bismuth oxychloride or mixtures thereof. Preference is given to a coating with zirconium dioxide and particularly preferably a coating with titanium dioxide.

These single-coated pigments are generally known; cf. for example DE-C 14 67 468, EP-A 45 851, DE-A 32 37 264 and DE-A 36 17 430. Metal oxide-coated mica platelets are also commercially available under the names Iriodin® (E. Merck, Darmstadt), Flonac® (Kemira Oy, Pori, Finland) or Mearlin® (Mearl Corporation, New York).

Further suitable substrates are plateletlike crystals of metal oxides as known for example for bismuth oxychloride and iron(III) oxide.

It is also conceivable to use plateletlike metal pigments which are stable under the coating conditions.

Possibilities include for example aluminum flakes already coated with a protective layer of oxide, in particular a layer of aluminum oxide, titanium oxide or iron oxide. Preference is given to titanium dioxide- and iron oxide-coated aluminum flakes, which according for example to U.S. Pat. No. 4,978,394 and EP-A 33 457 are preparable by gas phase decomposition of titanium tetrachloride or iron pentacarbonyl in the presence of aluminum flakes. The aluminum flakes themselves can be stamped out of aluminum foil or be prepared by known atomization and grinding techniques and are also commercially available (eg. from Eckart, Fürth, and Alcan-Toyo, Maisons-Laffitte).

Also possible are steel flakes which can be produced by similar techniques and are stable under the coating conditions.

The size of the substrate particles is not critical per se and can be adapted to the particular application. In general, the particles have largest diameters from about 1 to 200 $\mu$m, in particular from about 5 to 100 $\mu$m, and thicknesses from about 0.1 to 5 $\mu$m, in particular about 0.5 $\mu$m.

In the luster pigments of the invention, the substrate particles, which are either coated with highly refractive metal oxide or are uncoated, have a coating comprising bismuth vanadate.

In this way the luster pigments of the invention combine the high color strength of the pure yellow absorption pigment bismuth vanadate with the high luster of the interference pigment substrate. As well as the distinctly enhanced luster, the luster pigments of the invention have improved application properties such as easier dispersibility in paints than the pure bismuth vanadate pigments.

The bismuth vanadate layers of the invention may —like the pure bismuth vanadate pigments—be doped not only with anions but also with cations. Examples of preferred anionic dopants are borates, perborates, sulfates, silicates and phosphates. Examples of preferred cationic dopants are alkaline earth metal cations such as magnesium, calcium and strontium, zinc and aluminum. Particularly preferred bismuth vanadate layers of the invention contain phosphate and borate as dopants. Suitable dopant quantities are generally from 0.005 to 10% by weight, preferably from 0.01 to 4% by weight, of dopants, based on the coated pigment.

The process which the invention provides for preparing the novel luster pigments by precipitating bismuth vanadate from a bismuth salt solution with vanadate in the presence of the substrate particles results on the substrate surface in firmly adherent bismuth vanadate layers which are generally composed of bismuth vanadate-containing crystallites from 0.01 to 5 μm, preferably from 0.5 to 3 μm, in size. Depending on the amount of precipitated bismuth vanadate, the packing density of these crystallites will vary.

If filmlike layers of close-packed small (10–100 nm) crystallites are deposited, they can contribute to the interference of the coated luster pigment.

Generally, however, the precipitated bismuth vanadate-containing crystallites are too large to produce an interference-capable layer.

Depending on the interference color of the substrate, the products are either strong, pure yellow pigments (eg. substrate with golden or silvery interference color) or two-tone pigments which show the yellow mass tone and the interference color of the substrate (eg. substrate with red or blue interference color).

If the substrate used is an uncoated mica, for example ground muscovite, the application of a thin bismuth vanadate-containing layer will result in lustrous yellow pigments which in the applied state exhibit a small lightness flop. If the bismuth vanadate crystallites applied are from about 0.5 to 3 μm in size, no interference effects are observed. These luster pigments have the same good coloristic properties as the conventional bismuch vanadate pigments but are significantly easier to disperse in paints.

In the alternative, the bismuth vanadate layer of the invention may also take the form of a metal oxide matrix, in particular a matrix of silicon oxide and/or titanium oxide, incorporating the bismuth vanadate particles.

Luster pigments coated with such a bismuth vanadate layer can be prepared by having ready-formed bismuth vanadate pigments present at the time of precipitation of the metal hydroxide in an aqueous suspension of the substrate particles so that they are coprecipitated on the substrate surface.

Advantageously this is done by charging an aqueous suspension of the substrate particles initially, adding an aqueous dispersion of the bismuth vanadate pigment, and metering in an aqueous metal salt solution (eg. tin tetrachloride or sodium silicate solution). At the same time a base or acid is added in such a way that the pH of the mixture is maintained within a range within which the precipitation of the metal hydroxide takes place. The subsequent drying of the removed and washed pigment converts the precipitated hydroxides into the corresponding oxides or oxide hydrates.

Generally, the first-mentioned bismuth vanadate layers, where the bismuth vanadate is formed in situ, will be preferable.

Luster pigments coated with these bismuth vanadate layers can advantageously be obtained by the process of the invention by precipitating bismuth vanadate with an alkaline vanadate solution from an acidic bismuth salt solution in the presence of the substrate particles to be coated and of a base and in the presence or absence of dissolved salts of the abovementioned dopants and then filtering off the coated substrate particles and washing and drying them.

A suitable bismuth salt is in particular bismuth nitrate and suitable vanadates include for example ammonium and alkali metal, in particular sodium and potassium, orthovanadate and metavanadate.

Examples of soluble salts of the dopants are in addition to the corresponding alkaline earth metal salts in particular the alkali metal phosphates, hydrogenphosphates, borates, perborates, sulfates and silicates, in particular the sodium and potassium phosphates, hydrogenphosphates, borates, perborates, sulfates and silicates.

In a preferable embodiment of the process of preparation according to the present invention, the alkaline vanadate solution, which also contains dissolved phosphate and, if desired, borate, perborate, silicate and/or sulfate, is added to the acidic bismuth salt solution, in which the substrate particles are suspended, the mixture is brought with a base (eg. sodium hydroxide solution) to a pH from 2 to 6, preferably from 2.5 to 5, stirred at that pH for about 1 h, then brought to a pH from 5 to 8, preferably from 5.5 to 7, thereafter heated to the reflux temperature while the pH is kept constant with further base, and then further heated for from 0.5 to 5 h without further base, and the pigment is filtered off hot.

The phosphate is usually used in an amount from 0.5 to 50, preferably from 1 to 25, mol %, based on the bismuth concentration.

Suitable amounts of the other dopants are in general from 1 to 25, preferably from 2 to 15, mol %, based on the bismuth concentration.

In one version of the process according to the present invention, the bismuth salt solution is added to the vanadate solution, the mixture is brought with the base to a pH from 3 to 6.5 and kept constant at that pH with further base until the pH no longer decreases while the mixture is heated at up to 100° C., and the pigment is isolated after 0.5–5 h and heat-treated at 300°–600° C. for 0.5–5 h.

If desired, the luster pigments of the invention may additionally contain an outer, essentially colorless layer of metal oxides, oxide hydrates, metal silicates or metal phosphates, which can bring about an additional improvement in the application properties, for example the lightfastness, the thermal stability or the stability to acids and reducing agents. Such a layer preferably comprises aluminum hydroxide and/or calcium or zinc phosphate.

These layers can be applied to the pigment particles present in the form of an aqueous suspension by precipitation of a metal phosphate (eg. $Ca_3(PO_4)_2$) as described for example in U.S. Pat. No. 4,063,956.

The luster pigments of the invention are notable for good application properties, in particular their clean yellow hue, their color strength and their luster. They are readily dispersible in the application media, including in particular in paints, and are therefore advantageously usable for many purposes such as the coloring of paints, printing inks, plastics, glasses, ceramic products and decorative cosmetic preparations.

EXAMPLES

To a suspension of 40 g of the mica pigment X in $a_1$ g of an 11% strength by weight nitric acid aqueous bismuth nitrate solution (calculated as bismuth) was quickly added with stirring an alkaline aqueous solution containing $b_1$ g of sodium metavanadate solution (6.86% by weight of vanadium), $b_2$ g of trisodium phosphate dodecahydrate and $b_3$ g of sodium perborate tetrahydrate. The pH of the mixture was 0.1–1.

The suspension was then brought with 30% strength by weight sodium hydroxide solution to pH 3.5. It was then stirred at room temperature for 1 h while the pH was maintained within the range from 3.4 to 3.7 by metered addition of 4% strength by weight sodium hydroxide solution.

The pH was then raised to 6.0, again with 4% strength by weight sodium hydroxide solution, and kept constant during the heating to the reflux temperature by further addition of base.

On attainment of the reflux temperature the pH began to rise and the suspension turned yellow.

After two hours' refluxing the pigment was filtered off hot, washed salt-free and dried at 80° C. under reduced pressure.

Further particulars concerning these experiments and the results thereof are summarized in the following table:

TABLE

| Ex. | Mica pigment X | $a_1$ g of $BiNO_3$ solution | $b_1$ g of vanadate solution | $b_2$ g of $Na_3PO_4 \times 12H_2O$ | $b_3$ g of $NaBO_2 \times H_2O_2 \times 4H_2O$ | Hue |
| --- | --- | --- | --- | --- | --- | --- |
| 1 | Iriodin ® 103 rutile sterling silver (from Merck) | 235.6 | 90.8 | 5.66 | 2.29 | yellow |
| 2 | Iriodin 103 rutile sterling silver | 58.9 | 22.7 | 1.41 | 0.57 | yellow |
| 3 | Iriodin 103 rutile sterling silver | 117.8 | 45.4 | 2.83 | 1.14 | yellow |
| 4 | Iriodin 205 rutile brilliant gold | 235.6 | 90.8 | 5.66 | 2.29 | deep yellow |
| 5 | Iriodin 210 rutile pearl red | 235.6 | 90.8 | 5.66 | 2.29 | color flop: red → yellow |
| 6 | Iriodin 220 rutile pearl blue | 235.6 | 90.8 | 5.66 | 2.29 | color flop: blue → yellow |
| 7 | Iriodin 230 rutile pearl green | 235.6 | 90.8 | 5.66 | 2.29 | color flop: green → yellow |

We claim:

1. Luster pigments comprising coated platelet-shaped substrates wherein the coating comprises a layer comprising bismuth vanadate.

2. Luster pigments as claimed in claim 1 wherein the bismuth vanadate layer further comprises phosphate, borate, sulfate, silicate and/or metal oxide or metal oxide hydrate.

3. Luster pigments as claimed in claim 1 wherein the bismuth vanadate layer further comprises oxide or oxide hydrate of an alkali earth metal, silicon and/or titanium.

4. Luster pigments as claimed in claim 1 wherein the outer layer is an essentially colorless layer comprising metal oxide, metal silicate and/or metal phosphate.

5. Luster pigments as claimed in claim 1 wherein the substrate is a silicate with or without a coating of metal oxide.

6. A process for preparing the luster pigments of claim 1, which comprises using an alkaline vanadate solution to precipitate bismuth vanadate from an acidic bismuth salt solution in the presence of the substrate particles to be coated and of a base and in the presence or absence of dissolved phosphates, borates and/or hydrolyzable metal salts, filtering off the coated substrate particles thus obtained and washing and drying them.

7. A process as claimed in claim 6, wherein the alkaline vanadate solution is added to the acidic bismuth salt solution in which the substrate particles are suspended, the mixture is adjusted with a base to pH 2–6, stirred at that pH for about one hour, then adjusted again to pH 5–8, heated at constant pH to the reflux temperature, and then further heated for 0.5–5 hours, and the pigment is isolated.

8. A process as claimed in claim 6, wherein the acidic bismuth salt solution in which the substrate particles are suspended is added to the alkaline vanadate solution, the mixture is adjusted with a base to pH 3–6.5, the pH is kept constant with further base during the heating to 100° C. until the pH does not decrease again, and after 0.5–5 h the pigment is isolated and heat-treated at 300°–600° for 0.5–5 hours.

9. A process as claimed in claim 6, wherein the substrate particles coated with a bismuth vanadate layer are further coated in aqueous suspension with an outer layer of metal oxide or metal oxide hydrate by hydrolysis of a metal salt or with an outer layer of metal silicate or metal phosphate by precipitation of a metal silicate or metal phosphate and the pigment is isolated.

* * * * *